April 15, 1952 C. E. LOMAX 2,592,813

AUTOMATIC TELEPHONE SYSTEM PROVIDED WITH PARTY LINES

Filed June 8, 1949 2 SHEETS—SHEET 1

INVENTOR.
Clarence E. Lomax
BY
Smith, Olsen & Baird
Attys.

April 15, 1952 C. E. LOMAX 2,592,813

AUTOMATIC TELEPHONE SYSTEM PROVIDED WITH PARTY LINES

Filed June 8, 1949 2 SHEETS—SHEET 2

INVENTOR.
Clarence E. Lomax
BY
Smith, Olsen & Baird
Attys.

Patented Apr. 15, 1952 2,592,813

UNITED STATES PATENT OFFICE 2,592,813

AUTOMATIC TELEPHONE SYSTEM PROVIDED WITH PARTY LINES

Clarence E. Lomax, Chicago, Ill., assignor to Automatic Electric Laboratories, Inc., Chicago, Ill., a corporation of Delaware Application June 8, 1949, Serial No. 97,892

10 Claims. (Cl. 179—17)

The present invention relates to automatic telephone systems provided with party lines, and more particularly to improvements in such systems as disclosed in U. S. Patent No. 1,727,137, granted on September 3, 1929 to Rudolph H. Stehlik.

In the telephone system disclosed in the Stehlik patent some of the party lines have fewer connected stations than the maximum number they are adapted to serve, and apparatus is provided for the purpose of intercepting calls directed via associated connector switches having access to these party lines and intended for unconnected or disconnected stations. In accordance with the arrangement each connector switch having access to the party lines comprises, in addition to the pair of line wipers and the usual control or C wiper, an extra control or EC wiper, and the associated contact bank comprises four corresponding sections; which extra control wiper and associated contact bank section is employed in the testing arrangement for determining whether the particular called station on a called party line is operatively connected to the line conductors thereof.

While the telephone system disclosed in the Stehlik patent is entirely satisfactory in operation it is somewhat more expensive to manufacture than is desirable due primarily to the fact that each connector switch having access to the party lines must comprise the additional structure noted above.

Accordingly, it is a general object of the present invention to provide an improved telephone system of the type noted which is more economical to manufacture and which comprises connector switches having access to the party lines, wherein each connector switch incorporates only the pair of line wipers and the usual control wiper.

Another object of the invention is to provide in a telephone system of the type noted, an improved arrangement wherein both the usual idle-busy test and the special test to determine whether the particular called station on the called party line is operatively connected to the line conductors thereof are performed over the usual control conductor thereof.

A further object of the invention is to provide in a telephone system of the type noted, an improved arrangement whereby a no-service tone is returned over a calling connector switch when the particular called station on the called party line is not operatively connected to the line conductors thereof, thereby eliminating the necessity of an interceptor operator position.

Further features of the invention pertain to the particular arrangement of the circuit elements of the telephone system, whereby the above-outlined and additional operating features thereof are attained.

Figure 1:
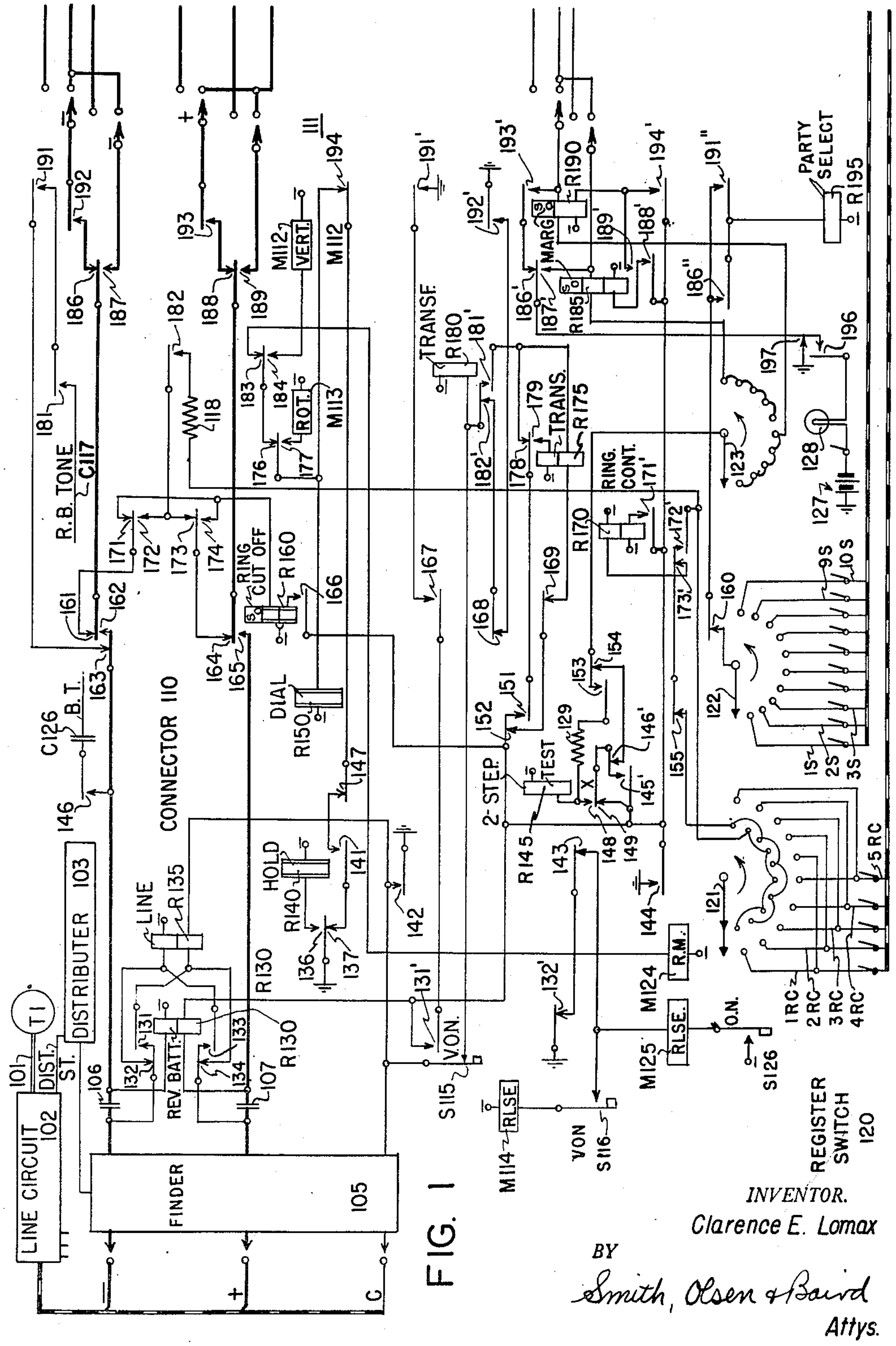
Figure 2:
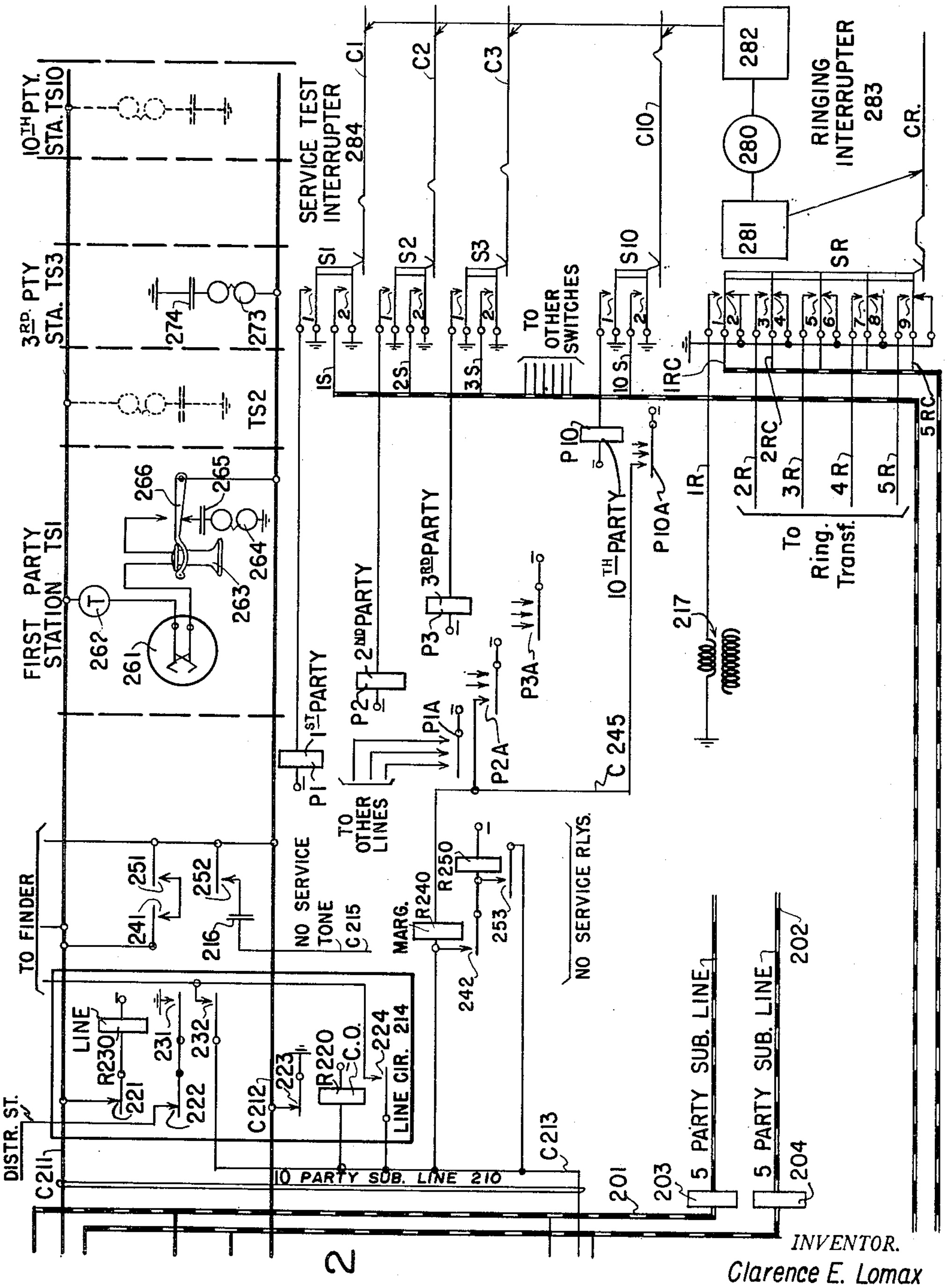

The invention both as to its organization and method of operation, together with further objects and advantages thereof, will best be understood by reference to the following specification taken in connection with the accompanying drawings, in which Figures 1 and 2, taken together, illustrate the details of an automatic telephone system provided with party lines and incorporating therein the features of the present invention. In the drawings Figs. 1 and 2 should be arranged respectively left and right in end-to-end relation in order to form a unified diagram.

Referring now more particularly to the drawings there is illustrated an automatic telephone system comprising an exchange serving a number of private subscriber lines, including the private subscriber line 101 extending to the private substation T1, a first group of five-party subscriber lines, including the five-party subscriber line 201, a second group of five-party subscriber lines, including the five-party subscriber line 202, and a group of ten-party subscriber lines, including the ten-party subscriber line 210. As indicated, each of the party subscriber lines 201 and 202 is adapted to serve a maximum of five individual stations although fewer stations may be actually operatively connected thereto; and, likewise, as indicated, the party subscriber line 210 is adapted to serve a maximum of ten individual stations, although fewer stations may be actually operatively connected thereto. For purpose of illustration it may be assumed that the first, third, fourth, fifth, sixth, seventh, eighth and ninth stations are operatively connected to the line conductors of the party line 210 and that the second and tenth stations are unconnected or disconnected from the line conductors of the party line 210. In any case, the second and tenth stations are not operatively connected to the line conductors of the party line 210 and calls may not be extended thereto as explained more fully hereinafter. In fact, the second and tenth stations may be unequipped or service thereto may have been discontinued.

The ten stations on the party line 210 are respectively indicated as TS1 to TS10, inclusive; and each equipped station comprises conventional substation apparatus. For example, the equipped first station TS1 comprises a telephone transmitter 262, a telephone receiver 263, a calling device or dial 261, a switchhook 266, and a ringer 264 operatively connected via the associated condenser 265 into the switchhook circuit including the associated switchhook 266. The substation apparatus provided in the equipped third station TS3 is not illustrated, although the ringer and associated condenser are respectively indicated at 273 and 274.

In the telephone system a divided ringing circuit arrangement is provided whereby the ringers 264, etc. at the odd stations TS1, TS3, TS5, TS7 and TS9 are operatively connected between the positive line conductor C212 of the party line 210 and ground; whereas the ringers, not shown, at the even stations TS4, TS6 and TS8 are operatively connected between the negative line conductor C211 of the party line 210 and ground. As indicated in dotted lines the ringers at the second and tenth stations TS2 and TS10 would be connected, if these two stations were equipped, between the negative line conductor C211 of the party line 210 and ground.

Each of the private and party subscriber lines is provided with a line circuit individual thereto, the line circuit individual to the private line subscriber 101 being indicated at 102, and the line circuits individual to the party subscriber lines 201 and 202 being respectively indicated at 203 and 204. The line circuit individual to the party subscriber line 210 is illustrated at 214 and comprises a line relay R230 and a cut off relay R220. Also the system comprises a distributor 103 operatively associated with the line circuits 102, 203, 204, 214, etc., as well as a plurality of finder-connector links.

One of the links is illustrated and comprises a finder 105 of any suitable type and a connected connector 110 of the Strowger type. As illustrated, the connector 110 comprises a Strowger mechanism 111 including first and second wiper sets, each including a pair of line wipers and a control wiper; the mechanism 111 being of the two-hundred-point type. Also the Strowger mechanism 111 comprises a vertical magnet M112 for driving the wiper carriage step by step in the vertical direction away from its normal vertical position, a rotary magnet M113 for driving the wiper carriage step by step in the rotary direction away from its normal rotary position, and a release magnet M114 for releasing the wiper carriage and for causing it to be returned to its normal rotary and vertical positions. Also associated with the wiper carriage of the Strowger mechanism 111 are two sets of switch springs S115 and S116 that are operated when the wiper carriage is driven in the vertical direction away from its normal vertical position.

Further the connector 110 comprises a register switch 120 of the minor type including three wipers 121, 122 and 123 provided with individually associated contact banks, a rotary magnet M124 for driving the wipers noted step by step in the counterclockwise direction away from their normal rotary positions, and a release magnet M125 for releasing the wipers noted and for causing them to be returned to their normal rotary positions. Also a set of switch springs S126 is operatively associated with the wipers noted of the register switch 120 and are operated when the wipers noted are rotated one step in the counterclockwise direction away from their normal rotary positions.

Further the connector 110 comprises a relay group including a reveres battery relay R130, a line relay R135, a hold relay R140, a test relay R145, a dial relay R150, a ring cut off relay R160, a ring control relay R170, two transfer relays R175 and R180, two switch relays R185 and R190, and a party select relay R195.

Also the exchange comprises common equipment including a ringing interrupter 283 and a service-test interrupter 284. The interrupters 283 and 284 are continually operated and may be driven from an associated motor 280 via respective speed reduction gear trains 281 and 282 operatively connected to the motor 280. Specifically, the ringing interrupter 283 comprises an insulating cam CR and an associated control switch SR; while the service-test interrupter 283 comprises ten insulating cams C1 to C10, inclusive, and ten respectively associated control switches S1 to S10, inclusive. The cam CR in the ringing interrupter 283 is driven through the speed reduction gearing 281 in order cyclically to control the switch SR at the required rate; while the ten cams C1 to C10, inclusive, are driven through the speed reduction gearing 282 in order sequentially and cyclically to control the ten control switches S1 to S10, inclusive, at the required rate. In fact, the cycle of operation of the service-test interrupter 284 may be considerably faster than the cycler of operation of the ringing interrupter 283.

Also the exchange comprises ten individual party relays P1 to P10, inclusive, respectively corresponding to the ten individual stations that each party subscriber line is adapted to serve. Thus the first party relay P1 corresponds to each first party station on each party subscriber line; the second party relay P2 corresponds to each second party station on each party subscriber line; etc. Each party subscriber line that has fewer than ten equipped party stations operatively connected to the line conductors thereof is further provided with two no-service relays individual thereto. Thus the party subscriber line 210 is provided with the two no-service relays R240 and R250 included in the line circuit 214 individual thereto, since the party subscriber line 210 does not comprise the second and tenth party stations operatively connected thereto as previously noted. The no-service relays R240, etc., are of the marginal type and are operatively connected between the control conductors of the respective party subscriber lines and individual guard conductors. For example, the winding of the no-service relay R240 individual to the party subscriber line 210 is operatively connected between the control conductor C213 of the party subscriber line 210 and the guard conductor C245 individual to the party subscriber line 210. The party relays P1, etc., are provided with armatures P1A, etc., that are adapted to close a plurality of contacts terminating the guard conductors of the various party subscriber lines. For example, since the second and tenth party stations are not operatively connected to the line conductors C211 and C212 of the party subscriber line 210, the guard conductor C245 individual to the party subscriber line 210 terminates in contacts appearing before the armatures P2A and P10A of the respective second and tenth party relays P2 and P10. Each of the armatures P1A, etc., of the party relays P1, etc., is operatively connected to negative battery potential.

Further the exchange comprises five sources of ringing frequencies, the first of which is indicated at 217, that are respectively connected to the associated ringing conductors 1R to 5R, inclusive, extending to the control switch SR; and five ringing conductors IRC to 5RC, inclusive, respectively extend from the control switch SR. Finally ten station conductors IS to IOS, inclusive, extend to the respective control switches SI to SI0, inclusive.

Also the exchange comprises a normal source of battery current supply and a booster battery source of current supply. The normal battery source of current supply is of 48 volts, the positive terminal of which is grounded and the negative terminal of which is connected to the various devices as indicated by the minus sign. The booster battery source of current supply is of 24 volts and is indicated at 127, the negative terminal of which is grounded and the positive terminal of which is connected via the various ballast lamps 128, etc., into the various connectors 110 for a purpose more fully explained hereinafter. Thus it will be understood that the various relays are normally energized from the normal 48 volts source of battery supply; while the various no-service relays R240, etc., may, under certain conditions described hereinafter, be energized from the normal 48 volts source of battery supply arranged in series with the booster battery 24 volts source of battery supply, producing a total energizing voltage of 72 volts.

The finders 105, etc., and the connectors 110, etc., have access to the various lines 101, 201, 202, 210, etc. More particularly, the private subscriber lines 101, etc., are arranged in two groups respectively appearing before the first or upper wiper sets and the second or lower wiper sets in the Strowger mechanisms 111, etc., respectively incorporated in the connectors 110, etc. The first group of five party subscriber lines, including the five party subscriber line 201, appears before the upper wiper sets incorporated in the various Strowger mechanisms 111, etc.; and the second group of five party subscriber lines, including the five party subscriber line 202, appears before the lower wiper sets incorporated in the various Strowger mechanisms 111, etc. Finally, the group of ten party subscriber lines, including the ten party subscriber line 210, appears before both the upper and lower wiper sets in the various Strowger mechanisms 111, etc., as explained more fully hereinafter. The register switches 120, etc., incorporated in the connectors 110, etc. have access both to the five ringing conductors IRC to 5RC, inclusive, and to the ten station conductors IS to IOS, inclusive.

Considering now the general operation of the common equipment incorporated in the exchange, it will be understood that the ringing interrupter 283 in each cycle of operation connects the five ringing conductors IRC to 5RC, inclusive, to the respective five ringing conductors IR to 5R, inclusive, and then disconnects the five ringing conductors IRC to 5RC, inclusive, from the respective five ringing conductors IR to 5R, inclusive, and connects the five ringing conductors IRC to 5RC, inclusive, to common ground potential; all as a result of the control by the cam CR of the control switch SR. Also, it will be understood that the service-test interrupter 284 in each cycle of operation sequentially operates and then restores the ten party relays PI to PI0, inclusive, and simultaneously and sequentially applies and then removes ground potential from the ten service conductors IS to IOS, inclusive; all as a result of the control by the cams CI to CI0, inclusive, of the respective control switches SI to SI0, inclusive. Specifically, the first cam CI in the service-test interrupter 284 closes and then opens the first and second contacts of the control switch SI, whereby the operation of the first party relay PI is simultaneous with the application of ground potential to the first station conductor IS.

In the telephone system each provided subscriber substation TI, etc., and each party subscriber substation TSI, etc., is assigned a three-digit directory number individual thereto, the first and second digits being indicative of a pair of terminal sets respectively appearing before the upper and lower wiper sets in the various connectors 110, etc., and the third digit being indicative of one of the terminal sets, as well as of a corresponding ringing setting in the connector 110, etc. The mode of operation of the apparatus incorporated in the telephone system will be better understood from the following description of calls involving the various subscriber substations.

First assuming that a call is initiated at the private subscriber substation TI, the associated line circuit 102 is controlled in order to cause the distributor 103 to assign an idle link, such, for example, as that illustrated, and then controls operation of the finder 105 to find the subscriber line 101 extending to the calling private subscriber substation TI. When the finder 105 finds the subscriber line 101 extending to the calling private subscriber substation TI the line circuit 102 individual thereto is controlled in order to mark the subscriber line 101 as busy to the connectors 110, etc., having access thereto and to dismiss the distributor 103. At this time a loop circuit is completed for energizing in series the upper and lower windings of the line relay R135; ground potential in the finder 105 being connected via the control conductor of the subscriber line 101, the lower winding of the line relay R135 and the contacts 134 to the positive line conductor of the subscriber line 101, and battery potential being connected via the upper winding of the line relay R135 and the contacts 132 to the negative line conductor of the subscriber line 101, and a bridge circuit at the calling private subscriber line TI being completed between the line conductors of the subscriber line 101. When the line relay R135 is thus energized, it operates to complete, at the contacts R136, a circuit for operating the hold relay R140. Upon operating the hold relay R140 completes, at the contacts 142, a multiple path for applying ground potential to the control conductor of the subscriber line 101 in order to retain the finder 105 in its operated position and to retain the line circuit 102 in its operated position. Also the application of ground potential to the control conductor of the subscriber line 101 completes a circuit, including the set of switch springs S115, for operating the transfer relay R180. Upon operating the transfer relay R180 prepares, at the contacts 184, a point in a circuit traced hereinafter for operating the vertical magnet M112 of the Strowger mechanism 111. Thus at this time the call initiated at the calling private subscriber substation TI has been extended via the subscriber line 101 and the finder 105 to the connector 110, and the connector 110 is conditioned to respond to the three digits comprising the directory number of the called station.

First assuming that this call is to be extended to the first party station TSI on the party subscriber line 210, the subscriber at the calling private subscriber substation TI dials the three-digit directory number of the called first party station TSI, which might be 241. The line relay R135 follows the impulses of the first digit 2; and each time the line relay R135 restores and then reoperates, it interrupts and then recompletes, at the contacts 136, the circuit for energizing the winding of the hold relay R140, whereby the latter is retained in its operated position during dialing as it is of the slow-to-release type. Also each time the line relay R135 restores and then reoperates, it completes and then interrupts, at the contacts 137, a circuit, including the contacts 141, 147 and 194, for energizing the winding of the dial relay R150; and a multiple circuit, also including the contacts 176 and 184, for operating the vertical magnet M112. Accordingly, the dial relay R150 operates and remains operated during dialing as it is of the slow-to-release type; and the vertical magnet M112 is operated and restored twice in succession driving the wiper carriage of the Strowger mechanism 111 two steps in the vertical direction away from its normal vertical position. Upon operating the dial relay R150 completes, at the contacts 151, a holding circuit, including the contacts 144, 178 and 181', for retaining operated the transfer relay R180. When the wiper carriage of the Strowger mechanism 111 is operated one step in the vertical direction away from its normal vertical position the set of switch springs S115 and S116 are operated. More particularly, the set of switch springs S115 is operated in order to interrupt the original circuit for operating the transfer relay R180; and the set of switch springs S116 is operated in order to prepare a circuit traced hereinafter for operating the release magnet M114.

At the conclusion of the first digit 2 the line relay R135 is retained in its operated position retaining operated the hold relay R140 and causing the dial relay R150 to restore shortly thereafter, the latter relay being of the slow-to-release type. Upon restoring the dial relay R150 first completes, at the contacts 152, a path, including the contacts 151, 178 and 169 for short-circuiting the lower winding of the transfer relay R175; and then interrupts, at the contacts 151, the above traced path and the multiple holding circuit for energizing the winding of the transfer relay R180; whereby there is completed a series circuit for energizing the lower winding of the transfer relay R175 and the winding of the transfer relay R180. This series circuit extends from ground by way of the contacts 144, 152 and 169 the lower winding of the transfer relay R175, the contacts 181' and the winding of the transfer relay R180 to battery; whereby the transfer relay R175 is operated and the transfer relay R180 is retained in its operated position. Upon operating the transfer relay R175 interrupts, at the contacts 176, a further point in the circuit for operating the vertical magnet M112, and prepares, at the contacts 177, a point in a circuit traced hereinafter for operating the rotary magnet M113.

The subscriber at the calling private subscriber substation T1 then proceeds to dial the second digit 4, whereby the line relay R135 again follows retaining operated the hold relay R140. Each time the line relay R135 restores and then reoperates it completes and then interrupts, at the contacts 137, the previously traced circuit for operating the dial relay R150 and the previously mentioned multiple circuit, including the contacts 177, for operating the rotary magnet M113. Accordingly, the dial relay R150 operates and remains operated during dialing and the rotary magnet M113 is operated and restored four times driving the wiper carriage of the Strowger mechanism 111 four steps in the rotary direction away from its normal rotary position. Upon operating the dial relay R150 completes, at the contacts 151, a holding circuit, including the contacts 144 and 179, for energizing the upper winding of the transfer relay R175, and interrupts, at the contacts 152, the previously traced circuit for energizing in series the lower winding of the transfer relay R175 and the winding of the transfer relay R180. Accordingly, at this time the transfer relay R175 is retained in its operated position and the transfer relay R180 restores. At the conclusion of the second digit 4 the line relay R135 is retained in its operated position retaining operated the hold relay R140 and causing the dial relay R150 to restore shortly thereafter, it being of the slow-to-release type. Upon restoring the dial relay R150 interrupts, at the contacts 151, the holding circuit for energizing the upper winding of the transfer relay R175. Accordingly, the transfer relay R175 restores, interrupting at the contacts 177, a further point in the circuit for operating the rotary magnet M113, and preparing, at the contacts 176, a point in a circuit traced hereinafter for operating the rotary magnet M124 of the register switch 120.

The subscriber at the calling private subscriber substation T1 then proceeds to dial the third digit 1, whereby the line relay R135 again follows retaining operated the hold relay R140. Also when the line relay R135 restores and then reoperates, it completes and then interrupts, at the contacts 137, the previously traced circuit for operating the dial relay R150 and the multiple circuit, including the contacts 176 and 183, for operating the rotary magnet M124. Accordingly, the dial relay R150 operates and remains operated during dialing and the rotary magnet M124 is operated and restored driving the wipers noted of the register switch 120 one step in the counterclockwise direction away from their normal rotary positions. When the wipers noted of the register switch 120 are thus driven one step in the counterclockwise direction away from their normal rotary positions, the set of switch springs S126 is operated to prepare a circuit traced hereinafter for operating the release magnet M125. At the conclusion of the third digit 1 the line relay R135 is retained in its operated position retaining operated the hold relay R140 and causing the dial relay R150 to restore shortly thereafter.

Thus at the conclusion of the second digit 4, the wiper carriage of the Strowger mechanism 111 has been set in the vertical and rotary directions, whereby both the upper and lower wiper sets engage the contact sets terminating the called party subscriber line 210. However, testing of the idle or busy condition of the selected called party subscriber line 210 by the test relay R145 does not take place at the conclusion of the second digit 4, since the wiper 123 of the register switch 120 still occupies its normal rotary position. However, at the conclusion of the third digit 1, the wiper 123 has selected the first section of the associated contact bank extending to the upper winding of the switch relay R190 and the test relay R145 performs the idle or busy test at this time prior to the restoration of the dial relay R150. Specifically, battery potential is applied by way of the winding of the test relay R145, the resistor 129, the contacts 153, the wiper 123 and the engaged first contact in the associated contact bank, the upper winding of the switch relay R190 and the control wiper of the upper wiper set to the control conductor C213 of the called party subscriber line 210.

First assuming that the called party subscriber line 210 is busy at this time, ground potential is applied to the control conductor C213 thereof completing the above traced circuit for energizing the winding of the test relay R145 in series of the upper winding of the switch relay R190; whereby the test relay R145 operates through its first step, it being of the two-step type, but the switch relay R190 is not operated as it is of the marginal type. When the test relay R145 operates through its first step, it prepares, at the contacts 148, a path traced hereinafter for short-circuiting the associated series connected resistor 129. Shortly thereafter, when the dial relay R150 restores it first completes, at the contacts 154, and then interrupts, at the contacts 153, the previously mentioned path for short-circuiting the resistor 129; which path when completed includes the contacts 148, 146′, 154 and 153. When the resistor 129 is thus short-circuited, a direct circuit is completed for energizing the winding of the test relay R145 in series with the upper winding of the switch relay R190; whereby the test relay R145 operates through its second step, although the switch relay R190 is not operated as it is of the marginal type. When the step relay R145 operates through its second step it completes, at the contacts 145′, a holding circuit, including the contacts 144 and 148, for energizing the winding thereof, and interrupts, at the contacts 146′, the above traced series circuit for energizing the upper winding of the switch relay R190. Also the test relay R145 completes, at the contacts 146, a connection, including the associated condenser, between the busy conductor C126 and the condenser C106 connected to the negative line conductor of the finder 105 and consequently to the negative line conductor of the subscriber line 101 extending to the calling private subscriber substation T1; whereby busy tone is returned to the calling private subscriber substation T1 indicating to the subscriber thereat that the desired connection may not be had at this time due to the busy condition of the called party subscriber line 210.

The subscriber at the calling private subscriber substation T1 then disconnects interrupting the loop circuit for retaining operated the line relay R135 causing the latter relay to restore and effect the restoration of the hold relay R140 shortly thereafter, it being of the slow-to-release type. Upon restoring the hold relay R140 interrupts at the contacts R142, the path for applying ground potential to the control conductor to the finder 105; whereby the finder 105 is released causing the line circuit 102 to mark the subscriber line 101 as idle to the connectors 110, etc., having access thereto. Also upon restoring the hold relay R140 completes, at the contacts, 143, multiple circuits respectively including the sets of switch springs S116 and S126 for operating the release magnets M114 and M125. Upon operating the release magnet M114 releases the wiper carriage of the Strowger mechanism 111 causing it to be returned to its normal rotary and vertical positions; and upon operating the release magnet M125 releases the wipers noted of the register switch 120 causing them to be returned in the clockwise direction back into their normal rotary positions. Finally, the hold relay R140 interrupts, at the contacts 144, the holding circuit for retaining operated the test relay R145. When the wiper carriage of the Strowger mechanism 111 is thus released the sets of switch springs S115 and S116 are operated, the set of switch springs S115 being operated again to connect battery potential by way of the winding of the transfer relay R180 to the control conductor of the finder 105, and the set of switch springs S116 being operated to interrupt the operating circuit for the release magnet M114. When the wipers noted of the register switch 120 are thus released the set of switch springs S126 is operated in order to interrupt the operating circuit for the release magnet M125. At this time the connector 110 is completely released and available for further use.

Now assume that after the connector 110 has been operated in accordance with the third digit 1 from the calling private subscriber substation T1 completing the directory number of the called first party station TS1 on the called party subscriber line 210, that the called party subscriber line 210 is idle. At this time battery potential via the winding of the cut off relay R220 in the line circuit 214 is applied to the control conductor C213 of the called party subscriber line 210 completing a path substantially identical to that previously traced for short-circuiting in series the winding of the test relay R145, the upper winding of the switch relay R190 and the winding of the cut off relay R220. Accordingly, in this event the test relay R145 is not operated; and shortly thereafter when the dial relay R150 restores it interrupts, at the contacts 153, the above traced series path for short-circuiting the windings noted. Specifically, upon restoring the dial relay R150 interrupts, at the contacts 153, the connection of the winding of the test relay R145 to the wiper 123, and completes, at the contacts 154, a direct path, including the contacts 146′, 149 and 144 for applying direct ground potential to the wiper 123. When direct ground potential is thus applied to the wiper 123, a circuit substantially identical to that previously traced is completed for energizing the upper winding of the switch relay R190 in series with the winding of the cut off relay R220; whereby the switch relay R190 operates shortly thereafter, it being of the slow-to-operate type. Upon operating the switch relay R190 completes, at the contacts 194′, a direct holding circuit, including the contacts 144, for energizing the lower winding thereof, and completes, at the contacts 193′, a direct path, including the contacts 186′ and 197, for applying direct ground potential to the test wiper of the upper wiper set and consequently to the control conductor C213 of the called party subscriber line 210 effecting operation of the cut off relay R220. This application of direct ground potential to the control conductor C213 of the called party subscriber line 210 marks the called party subscriber line 210 as busy to the other connectors having access thereto. Upon operating the cut off relay R220 interrupts, at the contacts 221 and 223 the normally completed paths for applying battery potential via the winding of the line relay R230 to the negative line conductor C211 and direct ground potential to the positive line conductor C212 in order to prevent operation of the line relay R230 when the call is subsequently answered at the called first party station TS1 on the called party subscriber line 210.

Also upon operating the switch relay R190 completes, at the contacts 192′, a circuit, including the contacts 168 and 182′, for reoperating the transfer relay R180. Upon reoperating the transfer relay R180 completes, at the contacts 181, a connection, including the contacts 191 and 163 and the condenser 106, between the ringback tone conductor C117 and the negative line conductor of the finder 105; whereby ring-back tone current is returned over the negative line conductor of the subscriber line 101 to the calling private subscriber substation T1 indicating to the subscriber thereat that the called first party station TS1 is being rung at this time. Also at this time the wiper 121 of the register switch 120 engages the first contacts in the associated contact bank selecting the first ringing conductor 1RC and connecting it directly to the resistor 118, since the ring control relay R170 does not occupy its operated position. Accordingly, the ringing connection is further extended via the contacts 182, 173, 164, 188 and 193 to the positive wiper of the upper wiper set and consequently to the positive line conductor C212 of the called party subscriber line 210. Also battery potential is connected via the upper winding of the ring cut off relay 160 and the contacts 171, 161, 186 and 192 to the negative wiper of the upper wiper set and consequently to the negative line conductor C211 of the called party subscriber line 210. Also at this time the wiper 122 of the register switch 120 has selected the first contact in the associated contact bank completing a direct connection between the first station conductor 1S to battery potential via the contacts 160 and 191'' and the winding of the party select relay R195.

The continuously operated ringing interrupter 283 cycles the control switch SR; whereby the ringing conductors 1R to 5R, inclusive, are selectively connected and disconnected with respect to the ringing conductors 1RC to 5RC, inclusive, as previously described. Thus when the ringing conductor 1R is connected to the ringing conductor 1RC at the first contacts of the control switch SR, ringing current of the first frequency is projected via the previously traced path over the positive line conductor C212 of the called party subscriber line 210 effecting operation of the ringer 264 at the first party station TS1 in order to signal the subscriber thereat. It will be understood that this first frequency applied to the positive line conductor C212 of the called party subscriber line 210 selectively operates the ringer 264 connected between the positive line C212 and ground via the associated condenser 265, since the ringer 264 is selectively tuned; whereby the other ringers 273, etc., at the other odd party stations on the called party subscriber line 210 are not operated.

Also the continuously operated service-test interrupter 284 sequentially operates the control switches S1, etc., in its cycle as previously explained. When the control switch S1 is thus operated there is completed at the first contacts thereof, a circuit for operating the first party relay P1 and there is simultaneously completed at the second contacts thereof a path for applying ground potential to the first station conductor 1S. The application of ground potential to the first station conductor 1S completes a circuit substantially identical to that previously traced and including the wiper 122 of the register switch 120 and the engaged first contact in the associated contact bank for operating the party select relay R195. Upon operating the party select relay R195 interrupts, at the contacts 197, the previously traced direct path for applying ground potential via the control wiper of the upper wiper set to the control conductor C213 of the called party subscriber line 210, and completes, at the contacts 196, a substantially identical path for applying booster battery potential from the booster battery 127 via the associated ballast lamp 128 and the control wiper of the upper wiper set to the control conductor C213. This substitution of booster battery potential for ground potential upon the control conductor C213 retains the party subscriber line 210 marked as busy to the other connectors having access thereto and prepares the no-service relay R240 for operation. Upon operating the first party relay P1 applies at the armature P1A ground potential to the various guard conductors of the party subscriber lines at which the first party stations are disconnected. However, there is no connection at the armature P1A to the guard conductor C245 of the called party subscriber line 210, whereby the no-service relay R240 is not operated at this time due to the absence of battery potential upon the guard conductor C245. Subsequently the service test interrupter 284 restores the first control switch S1 and operates the second control switch S2 as previously explained; whereby the first party relay P1 is restored and the second party relay P2 is operated so that ground potential is removed from the first station conductor 1S and ground potential is applied to the second station conductor 2S. Since the wiper 122 of the register switch 120 has selected the first station conductor 1S the party select relay 195 restores when ground potential is removed from the first station conductor 1S, again substituting, at the contacts 197 and 196, ground potential for booster battery potential upon the control conductor C213 of the called party subscriber line 210. Upon operating the second party relay P2 completes, at the armature P2A, the application of battery potential to the guard conductor C245 of the called party line subscriber 210. Accordingly, at this time, the winding of the no-service relay R240 is energized with normal battery potential due to the presence of ground potential upon the control conductor C213; however, the no-service relay R240 does not operate as it is of the marginal type. As explained more fully hereinafter the no-service relay R240 will not operate unless booster battery potential is applied to the control conductor C213 simultaneously with the application of ordinary battery potential upon the guard conductor C245; which matching never occurs in the present connection. This failure to match booster battery potential upon the control conductor C213 and ordinary battery potential upon the guard conductor C245 is due to the lack of a strap between the armature P1A of the first party relay P1 and the guard conductor C245; which strap is omitted since the first party station TS1 on the called party subscriber line 210 is equipped.

Accordingly, the register switch 120 has been operated into its first ringing setting and ringing in accordance with the first frequency over the positive line conductor C212 of the called party subscriber line 210 continues until the call is answered at the called first party station TS1 or until the call is abandoned at the calling private subscriber substation T1. When the subscriber at the called first party station TS1 answers the call by removing the receiver 263 from the switchhook 266 the circuit for operating the ringer 264 is interrupted and a bridge circuit is completed at the switchhook 266 via the receiver 263 the dial 261 and the transmitter 262 across the line conductors C211 and C212 of the called party subscriber line 210, whereby a circuit is completed for energizing the upper winding of the ring cut off relay R160. This circuit extends from ground potential either during a ringing period or a silent period via the first ringing conductor IRC over the previously traced path to the positive line conductor C212, and from battery potential via the upper winding of the ring cut off relay R160 and the previously traced path to the negative line conductor C211. When the upper winding of the ring cut off relay R160 is thus energized the latter relay operates shortly thereafter, it being of the combination slow-to-operate and slow-to-release type. Upon operating the ring cut off relay R160 completes, at the contacts 166, a holding circuit, including the contacts 144, for energizing the lower winding thereof; and interrupts, at the contacts 161 and 164, points in the circuit for projecting ringing current over the line conductors C211 and C212 of the called party subscriber line 210. Also the ring cut off relay R160 interrupts, at the contacts 163, the previously traced path for returning ring-back tone current over the negative line conductor of the subscriber line 101 and interrupts, at the contacts 168, a further point in the previously traced circuit for operating the transfer relay R180. Also the ring cut off relay R160 interrupts, at the contacts 160, the circuit for operating intermittently the party select relay R195. Further the ring cut off relay R160 interrupts, at the contacts 169, a point in the holding circuit for energizing the lower winding of the transfer relay R175 in series with the winding of the transfer relay R180 in order to effect restoration of the latter relays at this time. Finally, the ring cut off relay R160 completes, at the contacts 162 and 165, a loop circuit for energizing in series the upper and lower windings of the reverse battery relay R130. This circuit extends from ground potential by way of the contacts 144, the lower winding of the reverse battery relay R130, the contacts 165, 188 and 193 to the positive line wiper of the upper wiper set, and from battery potential by way of the upper winding of the reverse battery relay R130 and the contacts 162, 186 and 192 to the negative line wiper of the upper wiper set; the circuit finally including the line conductors C211 and C212 and the bridge connection at the called first party station TS1. When this circuit is completed the reverse battery relay R130 operates to complete, at the contacts 131′, a multiple holding circuit, including the contacts 167, and 191′, for energizing in series the upper and lower windings thereof, and interrupts, at the contacts 132′ a further point in the multiple circuits for operating the release magnets M114 and M125. Finally, the reverse battery relay R130 reverses at the contacts 131, 132, 133 and 134 the polarity of the connection between the upper windings of the line relay R135 and the line conductors of the subscriber line 101 extending to the calling private subscriber substation T1; which reversal of polarity over the line conductors of the subscriber line 101 may be employed at the line circuit 102 for metering or other purposes in a conventional manner, not shown. Finally the loop circuit extending from the calling private subscriber substation T1 to the upper and lower windings of the line relay R135 is operatively connected by the condensers 106 and 107 to the loop circuit extending between the called first party station TS1 and the upper and lower windings of the reverse battery relay R130; whereby the subscriber at the calling private subscriber substation T1 and the subscriber at the called first party station TS1 may converse with each other.

At the conclusion of the established connection when the subscriber at the calling private subscriber substation T1 disconnects, the loop circuit extending to the line relay R135 is interrupted causing the latter relay to restore and effect restoration of the hold relay R140 shortly thereafter, the latter relay being of the slow-to-release type. When the subscriber at the called first party station TS1 disconnects, the loop circuit extending to the reverse battery relay R130 is interrupted causing the latter relay to restore and complete, at the contacts 132′, the previously traced circuits for operating the release magnets M114 and M125, whereupon the Strowger mechanism 111 and the register switch 120 are released in the manner previously explained. Also upon restoring the reverse battery relay interrupts, at the contacts 131′, a multiple holding circuit, including the contacts 167 and 191′, for retaining operated the ring cut off relay R160 and the switch relay R190 causing the latter relay to restore, the ring cut off relay R160 taking a brief time interval to restore as it is of the combination slow-to-operate and slow-to-release type. When ground potential is thus removed from the control conductor of the finder 105, the finder 105 is released and the line circuit 102 is controlled to mark the subscriber line 101 as idle to the connectors 110, etc., having access thereto. At this time the connector 110 is completely released and the circuit for retaining operated the cut off relay R220 in the line circuit 214 is interrupted causing the latter relay to restore. Upon restoring the cut off relay R220 again connects at the contacts 221 and 223 battery and ground potential to the line conductors C211 and C212 of the party subscriber line 210. Also at this time ground potential is removed from the control conductor C213 of the party subscriber line 210 and battery potential via the winding of the cut off relay R220 is returned to the control conductor C213, whereby the party subscriber line 210 is again marked as idle to the connectors having access thereto. At this time the established connection between the calling private subscriber substation T1 and the called party station TS1 is released and all of the apparatus involved therein is completely released and available for further use.

Assuming now that the subscriber at the calling private subscriber substation T1 initiates a call and attempts to direct the call to the second party station TS2 that is not operatively connected to the party subscriber line 210, the subscriber at the calling private subscriber substation T1 after initiating the call, dials the directory number 242 that would normally be assigned to the second party station TS2 on the called party subscriber line 210. Again the finder 105 and the connector 110 may be taken into use, and again the Strowger mechanism 111 in the connector 110 may be operated to select the called party subscriber line 210; all in the manner previously explained. The test relay R145 again tests the idle or busy condition of the called party subscriber line 210 following the registration of the third digit 2 in the register switch 120; all in the manner described above. The subsequent operation of the connector 110 is controlled in accordance with the idle or busy condition of the called party subscriber line 210 in the manner previously explained; and for purpose of illustration it may be assumed that the called party subscriber line 210 is idle at this time, whereby the switch relay R190 is again operated. In this example the wiper 121 of the register switch 120 engages the second contacts in the associated contact bank; whereby a circuit, including the contacts 155 and 173', is completed between the second ringing conductor 2RC and the upper winding of the ring control relay R170. More particularly, the upper winding of the ring control relay is energized causing the latter relay to operate in order to complete, at the contacts 171', a holding circuit, including the contacts 144, for energizing the lower winding thereof. Also the ring control relay R170 interrupts, at the contacts 173', the original circuit for energizing the upper winding thereof, and completes, at the contacts 172', a connection, including the contacts 155, between the second ringing conductor 2RC and the resistor 118. Also upon operating the ring control relay R170 reverses, at the contacts 171, 172, 173 and 174, the connections between the resistor 118 and the upper winding of the ring cut off relay R160 and the respective positive and negative line wipers of the upper wiper set of the Strowger mechanism 111. Accordingly, the second ringing conductor 2RC is now connected via the wiper 121 of the register switch 120 and the engaged second contact in the associated contact bank, the contacts 155 and 172', the resistor 118 and the contacts 182, 172, 161, 186 and 192 to the negative line wiper of the upper wiper set and consequently to the negative line conductor C211 of the called party subscriber line 210; while the upper winding of the ring cut off relay R160 is connected via the contacts 174, 164, 188 and 193 to the positive line wiper of the upper wiper set and consequently to the positive line conductor C212 of the called party subscriber line 210. Accordingly, ringing with the second frequency from the second ringing conductor 2R under the control of the control switch SR is initiated over the negative line conductor C211 of the called party subscriber line 210 since the called second party station TS2 would, if equipped, comprise a ringer connected between the negative line conductor C211 and ground potential via an associated condenser.

In the present example when the second control switch S2 is operated by the service-test interrupter 284 the second party relay P2 is operated and ground potential is applied to the second station conductor 2S. The application of ground potential to the second station conductor 2S effects operation of the party select relay R195 since the wiper 122 of the register switch 120 engages the second contact in the associated contact bank at this time. Accordingly, the party select relay R195 operates to substitute, at the contacts 197 and 196, booster battery potential for ground potential upon the control conductor C213 of the party subscriber line 210. Upon operating the second party relay P2 completes, at the armature P2A, the application of battery potential upon the guard conductor C245. Accordingly, booster battery potential is applied to the control conductor C213 and ordinary battery potential is applied to the guard conductor C245, whereby the no-service relay R240 is operated since it is of the marginal type. Upon operating the no-service relay R240 completes, at the contacts 242, a circuit, including the control conductor C213, for operating the no-service relay R250; and upon operating the no-service relay R250, completes at the contacts 253, a holding circuit, including the control conductor C213 for energizing the winding thereof. Hence the no-service relay R240 is operated in the present example since the booster battery potential applied to the control conductor C213 matches the ordinary battery potential simultaneously applied to the guard conductor C245, this resulting from the strap between the contacts controlled by the armature P2A of the second party relay P2 and the guard conductor C245, since the called second party station TS2 is not operatively connected to the line conductors C211 and C212 of the called party line 210.

Upon operating the no-service relay R250, also completes at the contacts 251, a bridge circuit, including the contacts 241, between the line conductors C211 and C212 of the called party subscriber line 210 effecting operation of the ring cut off relay R160 and the consequent switching through of the connection between the calling subscriber line 101 and the line conductor C211 and C212 of the called party subscriber line 210. Also upon operating the ring cut off relay R160, interrupts at the contacts 160, the circuit for retaining operated the party select relay R195; whereby the latter relay upon restoring substitutes, at the contacts 197 and 196, ground for booster battery potential upon the control conductor C213; whereby the no-service relay R240 restores since it is of the marginal type, while the no-service relay R250 is retained in its operated position. Further the operated no-service relay R250 completes, at the contacts 252, a connection, including the condenser 216, between the no-service tone conductor C215 and the positive line conductor C212 of the called party subscriber line 210; whereby no-service tone is returned over the positive line conductor of the subscriber line 101 to the calling private subscriber substation T1 indicating to the subscriber thereat that service is not rendered to the called second party station TS2.

Upon receiving the no-service tone the subscriber at the calling private subscriber substation T1 disconnects effecting the release of the line relay R135 and the consequent release of the hold relay R140 shortly thereafter, the latter relay being of the slow-to-release type. Upon restoring the hold relay R140 effects operation of the release magnets M114 and M125, whereby the Strowger mechanism 111 and the register switch 120 are released in the manner previously explained. Also the hold relay R140 interrupts, at the contacts 144, the multiple holding circuits for energizing the lower windings of the ring cut off relay R160, the ring control relay R170 and the switch relay R190 causing these relays to restore. Thus the finder 105 and the connector 110 are released in the manner previously explained, whereby the line circuit 102 is operated to mark the subscriber line 101 extending to the private subscriber substation T1 as idle to the connectors 110, etc., having access thereto. When the connector 110 is thus released ground potential is removed from the control conductor C213 of the party subscriber line 210 interrupting the circuit for retaining operated the cut off relay R220 and the no-service relay R250; whereby battery potential is again applied via the winding of the cut off relay R220 to the control conductor C213 again marking the party subscriber line 210 as idle to the connectors 110, etc., having access thereto. Upon restoring the no-service relay R250 interrupts, at the contacts 252, the connection between the no-service tone conductor C215 and the positive line conductors C212 of the party subscriber line 210. At this time the connection from the calling private subscriber substation T1 to the called party subscriber line 210 is released and all of the apparatus involved therein is completely released and available for the use.

In the foregoing description of the operation of the no-service relay R240 as a consequence of the registration of the third digit 2 in the register switch 120 following the operation of the Strowger mechanism 111 in response to the first and second digits 2 and 4 to select the called party subscriber line 210, it was assumed that ringing was initiated over the negative line conductor C211 of the called party subscriber line 210 prior thereto; and certainly this operation occurs upon occasion. On the other hand, it may occur that the no-service relay R240 is operated prior to the initiation of ringing over the negative line conductor C211 of the called party subscriber line 210. This relationship depends entirely upon the position in the cycles of the interrupters 283 and 284 when the connector 110 determines that the called party subscriber line 210 is idle and is of no material consequence in view of the fact that the no-service relay R240 operates in a short time interval following testing by the connector 110 of the called party subscriber line 210 as being idle. In any case the no-service relay R240 operates effecting operation of the no-service relay R250 and the consequent operation of the ring cut off relay R160; whereby, in fact, there is no effective ringing over the negative line conductor C211 of the called party subscriber line 210 regardless of the positions of the interrupter 283 and 284 in their cycles when the connector 110 tests the called party subscriber line 210 as being idle.

In view of the foregoing description of the mode of operation of the register switch 120 in order to effect ringing over the positive and negative line conductors C212 and C211, respectively, of the called party subscriber line 210 in response to the registration of the third digits 1 and 2, respectively, it will be understood that when an odd third digit is registered in the register switch 120 the ring control relay R170 is not operated and that when an even third digit is registered in the register switch 120 the ring control relay R170 is operated. When the ring control relay R170 occupies its restored position ringing proceeds over the negative line conductor of the selected line and when the ring control relay R170 occupies its operated position ringing proceeds over the negative line conductor of the selected line. Thus the ring control relay R170 controls divided ringing over the positive and negative line conductors of the selected line. Also when the third digit registered in the register switch 120 comprises the digits 1, 2, 3, 4 or 5, the wiper 123 thereof selects the upper winding of the switch relay R190, whereby the test is performed to determine the idle or busy condition of the called line via the control wiper of the upper wiper set and the upper wiper set is ultimately employed in extending the connection. On the other hand, when the third digit registered in the register switch 120 comprises the digits 6, 7, 8, 9 or 0, the wiper 123 thereof selects the upper winding of the switch relay R185; whereby the test is performed to determine the idle or busy condition of the called line via the control wiper of the lower wiper set and the lower wiper set is ultimately employed in extending the connection. In the last mentioned case when the calling line is tested as being idle by the test relay R145 the switch relay R185 operates completing, at the contacts 188', a holding circuit, including the contacts 144, for energizing the lower winding thereof, and completing, at the contacts 188' and 189', a substantially identical multiple circuit for energizing the lower winding of the switch relay R190 in order to cause operation thereof. Thus in the last-mentioned case both of the switch relays R185 and R190 are operated, the switch relay R185 extending the connection at the contacts 187 and 189 to the negative and positive line wipers of the lower wiper set and applying ground potential at the contacts 187' to the control wiper of the lower wiper set. Upon operating the switch relay R190 performs its other control functions, such, for example, as completing, at the contacts 192', the circuit for reoperating the transfer relay R180. Also it will be understood that the first, second, third, fourth and fifth contacts in the contact bank associated with the wiper 121 of the register switch 120 are respectively multiple to the sixth, seventh, eighth, ninth and tenth contacts in this contact bank. Thus it will be understood that when the third digit 1 is registered in the register switch 120 ringing with the first frequency proceeds over the positive line wiper of the upper wiper set; and when the third digit 2 is registered in the register switch 120 ringing with the second frequency proceeds over the negative line wiper of the upper wiper set. Similarly, when the third digit 3 is registered in the register switch 120 ringing with the third frequency proceeds over the positive line wiper of the upper wiper set; and when the third digit 4 is registered in the register switch 120 ringing with the fourth frequency proceeds over the negative line wiper of the upper wiper set. Similarly, when the third digit 5 is registered in the register switch 120 ringing with the fifth frequency proceeds over the positive line wiper of the upper set; and when the third digit 6 is registered in the register switch 120 ringing with the first frequency proceeds over the negative line wiper of the lower wiper set. Similarly, when the third digit 7 is registered in the register switch 120 ringing with the second frequency proceeds over the positive line wiper of the lower wiper set; and when the third digit 8 is registered in the register switch 120 ringing with the third frequency proceeds over the negative line wiper of the lower wiper set. Similarly, when the third digit 9 is registered in the register switch 120 ringing with the fourth frequency proceeds over the positive line wiper of the lower wiper set; and when the third digit 0 is registered in the register switch 120 ringing with the fifth frequency proceeds over the negative line wiper of the lower wiper set.

In view of the foregoing, it will be understood that connections may be extended to the first party station TS1, to the third party station TS3, to the fourth party station TS4, to the fifth party station TS5, to the sixth party station TS6, to the seventh party station TS7, to the eighth party station TS8 and to the ninth party station TS9 on the party subscriber line 210 in response to dialing of the respective directory numbers 241, 243, 244, 245, 246, 247, 248 and 249, and that in response to dialing the directory numbers 242 and 240 the no-service relay R240 and R250 are operated since the corresponding second and tenth stations TS2 and TS10, respectively, are not operatively connected to the line conductors of the party subscriber line 210. In other words, the tenth party relay P10 effects operation of the no-service relays R240 and R250 just like the second party relay P2 due to the strapping previously described to the guard conductor C245 of the party subscriber line 210.

In the foregoing description the operation of the ringing interrupter 283 was explained in conjunction with frequency ringing, although it will be understood that coded ringing may be employed, as the essential cooperation between the interrupters 283 and 284 is not in any way dependent upon the character of the ringing connections employed in the ringing interrupter 283.

In view of the foregoing explanation of the mode of operation of the connector 110, it will be understood that the five stations on the five party subscriber line 201 may be reached over the upper wiper set in response to dialing of the five corresponding directory numbers, such, for example, as the directory numbers 351, 352, 353, 354 and 355; and that the five stations on the five party subscriber line 202 may be reached over the lower wiper set in response to dialing of the five corresponding directory numbers 356, 357, 358, 359 and 350. This operation follows since the five party subscriber lines 201 and 202 are paired with each other and the stations provided thereon have divided ringing circuits similar to the stations TS1, etc., on the party subscriber line 210. Also it will be understood that the individual stations that are not equipped on the various five party lines 201, 202, etc., are appropriately wired to the armatures of the various party relays P1 to P10, inclusive, in order that corresponding no-service relays in the respective line circuits 203, 204, etc., may be selectively controlled for the purpose previously described. Specifically, the five stations on the five party line 201 are correlated with respect to the first five party relays P1 to P5, inclusive, while the five stations on the five party line 202 are correlated with respect to the second five party relays P6 to P10, inclusive. In other words, the no-service tone is returned over the connector 110 to the calling subscriber substation when a directory number is registered in the connector 110 corresponding to a station on one of the five party lines 201, 202, etc., that is not operatively connected to the line conductors thereof, the operation being identical to that described above.

In view of the foregoing it is obvious that there has been provided an improved telephone system provided with party lines in which the connector incorporates an improved arrangement for returning a no-service tone to a calling subscriber substation when a directory number is registered that identifies a party station on a party line that is not operatively connected to the line conductors of the called party line.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A telephone system comprising a party line including a pair of line conductors and a control conductor and adapted to serve a given maximum number of stations, a plurality of stations fewer in number than said given number operatively connected to said line conductors, a switch having access to said party line and including a plurality of ringing settings respectively corresponding to said given number of stations, means for selectively operating said switch to select said party line and to select one of said ringing settings, means for testing over said control conductor both the busy or idle condition of said party line and the presence or absence of one of said stations corresponding to said selected one ringing setting, and means responsive jointly to testing of said party line as idle and to testing of the presence of one of said stations corresponding to said selected one ringing setting for ringing over said line conductors in accordance with said selected one ringing setting in order to signal said one station.

2. A telephone system comprising a party line including a pair of line conductors and a control conductor and adapted to serve a given maximum number of stations, a plurality of stations fewer in number than said given number operatively connected to said line conductors, a switch having access to said party line and including a plurality of ringing settings respecttively corresponding to said given number of stations, means for selectively operating said switch to select said party line and to select one of said ringing settings, means for testing over said control conductor both the busy or idle condition of said party line and the presence or absence of one of said stations corresponding to said selected one ringing setting, means responsive jointly to testing of said party line as idle and to testing of the presence of one of said stations corresponding to said selected one ringing setting for ringing over said line conductors in accordance with said selected one ringing setting in order to signal said one station, and means responsive jointly to testing of said party line as idle and to testing of the absence of one of said stations corresponding to said selected one ringing setting for preventing effective ringing over said line conductors.

3. A telephone system comprising a party line including a pair of line conductors and a control conductor and adapted to serve a given maximum number of stations a plurality of stations fewer in number than said given number operatively connected to said line conductors, a switch having access to said party line and including a plurality of ringing settings respectively corresponding to said given number of stations, means for selectively operating said switch to select said party line and to select one of said ringing settings, means for testing over said control conductor both the busy or idle condition of said party line and the presence or absence of one of said stations corresponding to said selected one ringing setting, means responsive to testing of said party line as busy for returning a busy signal over said switch, means responsive to testing of the absence of one of said stations corresponding to said selected one ringing setting for returning a no-service signal over said switch, and means responsive jointly to testing of said party line as idle and to testing of the presence of one of said stations corresponding to said selected one ringing setting for ringing over said line conductors in accordance with said selected one ringing setting in order to signal said one station.

4. A telephone system comprising a party line including a pair of line conductors and a control conductor and adapted to serve a given maximum number of stations, a plurality of stations fewer in number than said given number operatively connected to said line conductors, a switch having access to said party line and including a plurality of ringing settings respectively corresponding to said given number of stations, means for selectively operating said switch to select said party line and to select one of said ringing settings, means for testing over said control conductor both the busy or idle condition of said party line and the presence or absence of one of said stations corresponding to said selected one ringing setting, means responsive to testing of said party line as busy for returning a busy signal over said switch, means responsive to testing of said party line as idle for initiating ringing over said line conductors in accordance with said selected one ringing setting in order to signal said corresponding one station, means responsive to answering at said one station for arresting ringing over said line conductors, and means responsive to testing of the absence of one of said stations corresponding to said selected one ringing setting for arresting ringing over said line conductors and for returning a no-service signal over said switch.

5. A telephone system comprising a party line including a pair of line conductors and a control conductor and adapted to serve a given maximum number of stations, a plurality of stations fewer in number than said given number operatively connected to said line conductors, a switch having access to said party line and including a plurality of ringing settings respectively corresponding to said given number of stations, means for selectively operating said switch to select said party line and to select one of said ringing settings, means for testing said control conductor for an idle or busy marking thereon and for a no-service marking thereon, means governed by said testing means in response to an idle marking on said control conductor for ringing over said line conductors in accordance with said selected one ringing setting in order to signal the corresponding one of said stations, means governed by said testing means in response to a busy marking on said control conductor for returning a busy signal over said switch, means governed by said testing means in response to both an idle marking and a no-service marking on said control conductor for returning a no-service signal over said switch, line circuit means for normally applying an idle marking to said control conductor when said party line is idle, additional means governed by said testing means in response to an idle marking on said control conductor for applying an overriding busy marking to said control conductor, and means responsive jointly to selection of said one ringing setting by said switch and to predetermined strapping provided in the event no one of said stations corresponds to said selected one ringing setting for applying a no-service marking to said control conductor.

6. A telephone system comprising a party line including a pair of line conductors and a control conductor and adapted to serve a given maximum number of stations, a plurality of stations fewer in number than said given number operatively connected to said line conductors, a plurality of station conductors respectively corresponding to said given number of stations, a switch having access to said party line and to said station conductors and including a plurality of ringing settings respectively corresponding to said station conductors, means for selectively operating said switch to select said party line and to select one of said station conductors and the corresponding one of said ringing settings, means for testing said control conductor for an idle or busy marking thereon and for a no-service marking thereon, means governed by said testing means in response to an idle marking on said control conductor for ringing over said line conductors in accordance with said selected one ringing setting in order to signal the corresponding one of said stations, means governed by said testing means in response to a busy marking in said control conductor for returning a busy signal over said switch, means governed by said testing means in response to both an idle marking and a no-service marking on said control conductor for returning a no-service signal over said switch, line circuit means for normally applying an idle marking to said control conductor when said party line is idle, additional means governed by said testing means in response to an idle marking on said control conductor for applying an overriding busy marking to said control conductor, interrupter means for sequentially applying a first control potential to said station conductors and for simultaneously applying a second control potential to said control conductor upon each occasion that there is no corresponding station operatively connected to said line conductors, and means responsive to the application of said first control potential to said selected one of said station conductors for applying a third control potential to said control conductor, the simultaneous application of said second and third control potentials to said control conductor constituting a no-service marking.

7. A telephone system comprising a party line including a pair of line conductors and a control conductor and adapted to serve a given maximum number of stations, a plurality of stations fewer in number than said given number operatively connected to said line conductors, a plurality of station conductors respectively corresponding to said given number of stations, a switch having access to said party line and to said station conductors and including a pluarity of ringing settings respectively corresponding to said station conductors, means for selectively operating said switch to select said party line and to select one of said station conductors and the corresponding one of said ringing settings, means for testing said control conductor for an idle or busy marking thereon, means governed by said testing means in response to a busy marking on said control conductor for returning a busy signal over said switch, line circuit means for normally applying an idle marking to said control conductor when said party line is idle, means governed by said testing means in response to an idle marking on said control conductor for aplying an overriding busy marking to said control conductor and for initiating ringing over said line conductors in accordance with said selected one ringing setting in order to signal the corresponding one of said stations, means responsive to answering at said one station for arresting ringing over said line conductors, interrupter means for sequentially applying a first control potential to said station conductors and for simultaneously applying a second control potential to said control conductor upon each occasion that there is no corresponding station operatively connected to said line conductors, means responsive to the application of said first control potential to said selected one of said station conductors for applying a third control potential to said control conductor, and means responsive to the simultaneous application of said second and third control potentials to said control conductor for arresting ringing over said line conductors and for returning a no-service signal over said switch.

8. A telephone system comprising a plurality of party lines each including a pair of line conductors and a control conductor and each adapted to serve a given maximum number of stations, a plurality of stations operatively connected to the line conductors of each of said party lines, some of said party lines having fewer than said given number of stations operatively connected to the line conductors thereof, a plurality of station conductors respectively corresponding to said given number of stations, a plurality of party relays respectively corresponding to said given number of stations, interrupter means for sequentially applying a first control potential to said station conductors and for sequentially operating said party relays, said interrupter means simultaneously applying said first control potential to a given one of said station conductors and operating the corresponding one of said party relays, strapping means responsive to operation of any one of said party relays for applying a second control potential to the control conductors of said party line upon which corresponding ones of said stations are not operatively connected to the line conductors thereof, a plurality of switches each having access to said party lines and to said station conductors and each including a plurality of ringing settings respectively corresponding to said station conductors, means for taking any one of said switches into use and for selectively operating it to select any one of said party lines and to select any one of said station conductors and the corresponding one of said ringing settings, means included in said one switch for testing over the control conductor of said selected one party line the idle or busy condition thereof, means responsive to testing of said selected one party line as idle for ringing over the line conductors thereof in accordance with said selected one ringing setting in order to signal the corresponding one of said stations, normally effective means for subsequently completing a connection from said one switch over the line conductors of said selected one party line to said one station, means included in said one switch and responsive to the application of said first control potential to said selected one station conductor for applying a third control potential to the control conductor of said selected one party line, and means responsive to the simultaneous applications of said second and third potentials to the control conductor of said selected one party line for preventing the subsequent completion of a connection from said switch over the line conductors of said selected one party line.

9. A telephone system comprising a plurality of party lines each including a pair of line conductors and a control conductor and each adapted to serve a given maximum number of stations, a plurality of stations operatively connected to the line conductors of each of said party lines, some of said party lines having fewer than said given number of stations operatively connected to the line conductors thereof, a plurality of station conductors respectively corresponding to said given number of stations, a plurality of party relays respectively corresponding to said given number of stations, interrupter means for sequentially applying a first control potential to said station conductors and for sequentially operating said party relays, said interrupter means simultaneously applying said first control potential to a given one of said station conductors and operating the corresponding one of said party relays, strapping means responsive to operation of any one of said party relays for applying a second control potential to the control conductors of said party lines upon which corresponding ones of said stations are not operatively connected to the line conductors thereof, a plurality of switches each having access to said party lines and to said station conductors and each including a plurality of ringing settings respectively corresponding to said station conductors, means for taking any one of said switches into use and for selectively operating it to select any one of said party lines and to select any one of said station conductors and the corresponding one of said ringing settings, means included in said one switch for testing over the control conductor of said selected one party line the idle or busy condition thereof, means responsive to testing of said selected one party line as busy for returning a busy signal over said one switch, line circuit means for normally marking idle the control conductors of said party lines when they are idle, means included in said one switch and responsive to testing of said selected one party line as idle for marking busy the control conductor thereof and for initiating ringing over the line conductors thereof in accordance with said selected one ringing setting in order to signal the corresponding one of said stations, means responsive to answering at said one station for arresting ringing over the line conductors of said selected one party line, means included in said one switch and responsive to the application of said first control potential to said selected one station conductor for applying a third control potential to the control conductor of said selected one party line, and means responsive to the simultaneous applications of said second and third potentials to the control conductor of said selected one party line for arresting ringing over the line conductors thereof and for returning a no-service signal over said one switch.

10. A telephone system comprising a plurality of party lines each including a pair of line conductors and a control conductor and each adapted to serve a given maximum number of stations, a plurality of stations operatively connected to the line conductors of each of said party lines, some of said party lines having fewer than said given number of stations operatively connected to the line conductors thereof, the ones of said party lines having fewer than said given number of stations operatively connected to the line conductors thereof being provided with respective no-service relays, a plurality of station conductors respectively corresponding to said given number of stations, a plurality of station relays respectively corresponding to said given number of stations, interrupter means for sequentially applying a first control potential to said station conductors and for simultaneously and sequentially operating said station relays, strapping means responsive to operation of any one of said station relays for applying a second control potential to the no-service relays of said party lines upon which corresponding ones of said stations are not operatively connected to the line conductors thereof, a plurality of switches each having access to said party lines and to said station conductors and each including a plurality of ringing settings respectively corresponding to said station conductors, means for taking any one of said switches into use and for selectively operating it to select any one of said party lines and to select any one of said station conductors and the corresponding one of said ringing settings, means included in said one switch and responsive to the application of said first control potential to said selected one station conductor for applying a third control potential to via the control conductor of said selected one party line to the no-servicing relay thereof, means responsive to the simultaneous applications of said second and third potentials to the no-service relay of said selected one party line for effecting operation thereof, means responsive to failure of operation of the no-service relay of said selected one party line for ringing over the line conductors thereof in accordance with said selected one ring setting in order to signal the corresponding one of said stations, and means responsive to operation of the no-service relay of said selected one party line for preventing effective ringing over the line conductors thereof.

CLARENCE E. LOMAX.

REFERENCES CITED

The following references are of record in the file of this patent:

UNITED STATES PATENTS

| Number | Name | Date |
|---|---|---|
| 2,300,186 | Wallace | Oct. 27, 1942 |